July 28, 1964 P. J. VAN GERWEN 3,142,727

SPEECH SIGNAL TRANSMISSION SYSTEM

Filed Jan. 25, 1962

2 Sheets-Sheet 1

INVENTOR
PETRUS J. VAN GERWEN
BY
Frank R. Jifani
AGENT

INVENTOR
PETRUS J. VAN GERWEN

BY
[signature]
AGENT

United States Patent Office 3,142,727

Patented July 28, 1964

3,142,727

SPEECH SIGNAL TRANSMISSION SYSTEM

Petrus Josephus van Gerwen, Emmasingel, Eindhoven, Netherlands, assignor to North American Philips Company, Inc., New York, N.Y., a corporation of Delaware Filed Jan. 25, 1962, Ser. No. 168,754
Claims priority, application Netherlands Feb. 10, 1961
7 Claims. (Cl. 179—15.55)

The invention relates to a speech signal transmission system comprising a transmitter having a band compressor and a receiver having a band expander. The band compressor comprises a plurality of parallel connected channels, which are fed by signals lying in different formant regions. One of these channels (the first-mentioned channel) allows the lowest formant region to pass with natural fidelity. The other transmission channels are provided with a band compressor. The band expansion device comprising a corresponding number of parallel connected channels, which are fed by signals representing different formant regions. The receiving channel corresponding with the first-mentioned transmission channel (first mentioned receiving channel) allowing the received signals to pass with natural fidelity. The other transmission channels are provided with a band expander. In this transmission apparatus the band compression and expansion are realized by utilizing the properties of speech signals; the formant regions split up speech signals into frequency bands which comprise the modulations of the resonance frequencies of the oral, pharyngal and nasal cavities, i.e., the formant frequencies. The three lowest formant regions lie, for example, in the frequency ranges from 300 to 800 c./s., from 800 to 2000 c./s. and from 2000 to 3200 c./s.

In a known transmission apparatus of the kind set forth the band compression is achieved at the transmitter end by compressing the modulation frequencies in the formant regions from 800 to 2000 c./s. and from 2000 to 3200 c./s. by frequency division by a factor of, for example, 10 to a ten times smaller frequency range, whereas at the receiver end the correct frequency conditions are restored by frequency multiplication by a factor 10. With this transmission apparatus a total band compression factor of about 4 yields a fairly satisfactory transmission quality.

In order to improve the transmission quality, for example, in order to avoid interference notes, and still maintain a total band compression factor of about 4, each of the signals lying in the higher formant regions in a different transmission apparatus of the kind set forth was fed in the respective band compression channels to a formant frequency detector. The detector furnishes a voltage varying with the formant frequency of the signals in the respective higher formant region. At the receiver end the co-operating band expansion channels comprise a band shift device fed by the signals of the lowest formant region allowed to pass with natural fidelity, and these signals are shifted in frequency in the band shifting device within the respective higher formant region by an oscillation from a local oscillator. The frequency of the oscillator is varied with the output voltage of the formant frequency detector in the corresponding band compression channel. Such a system is disclosed in U.S. Letters Patent No. 3,102,929.

The invention has for its object to provide a new structure of the transmission apparatus of the kind set forth, in which, while a band compression factor of about 4 is maintained, the transmission quality is improved and the apparatus is simplified, since no additional measures are required for the reproduction of consonants.

In accordance with the invention the band expansion device comprises a local relaxation generator which produces a relaxation oscillation decreasing in a sawtooth-like manner with a repetition frequency lying in the fundamental tone frequency region. Each of the band expansion channels fed by the higher formant regions includes an amplitude modulator stage. These stages are controlled on the one hand in common by the output voltage of the local relaxation generator and on the other hand separately by the local oscillator associated with the band expansion channel concerned. The frequency of the oscillator varies with the output voltage of the formant frequency detector in the corresponding band compression channel.

The invention and its advantages will now be described more fully with reference to the figures.

Figure 1:
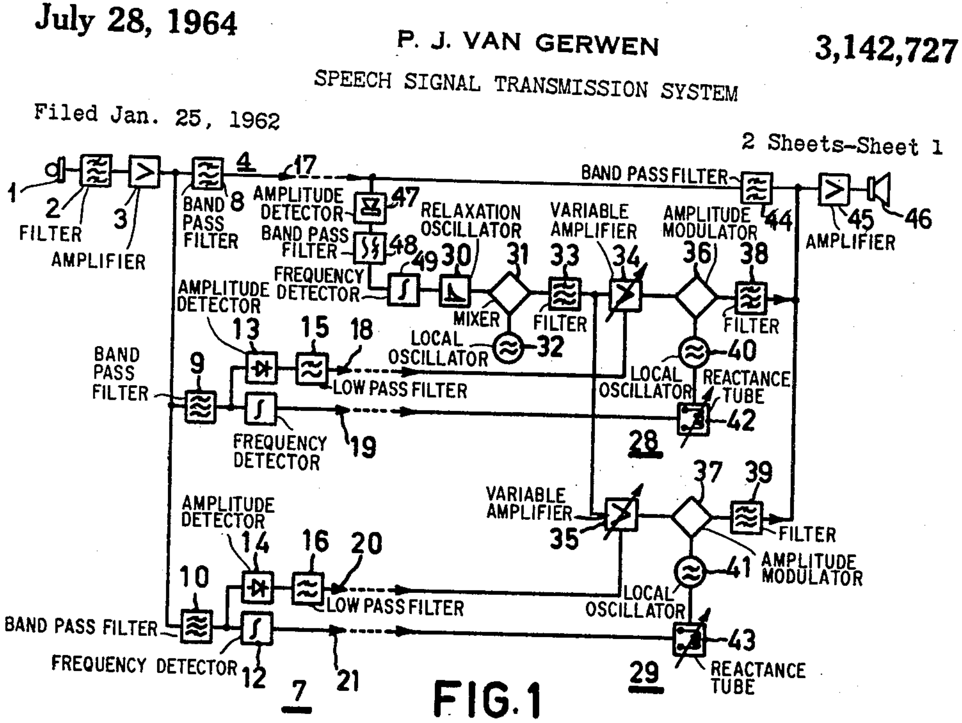
FIG. 1 shows diagrammatically one embodiment of a transmission apparatus according to the invention.

In the transmitter shown in FIG. 1 the signals derived from a microphone 1 are fed via a filter 2, allowing speech signals from 300 to 3200 c./s. to pass, subsequent to amplification in an amplifier 3 to a band compression device 4, which comprises three parallel-connected channels 5, 6 and 7. Each of these parallel-connected channels comprises an input filter 8, 9 and 10 respectively, which allows the passing of signals lying in the formant regions 300–800 c./s., 800–2000 c./s. and 2000–3200 c./s. respectively of the signals fed thereto. The channel 5 allows the signals of the lowest formant region from 300 to 800 c./s. to pass with natural fidelity, whereas the speech signals of the higher formant regions from 800 to 2000 c./s. and from 2000 to 3200 c./s. in the channels 6 and 7 are fed to a formant frequency detector 11 and 12 respectively, which furnishes a direct voltage varying with the formant frequency of the formant regions from 800 to 2000 c./s. and from 2000 to 3200 c./s.; the bandwidth required for transmission is, for example, approximately 30 c./s.

Moreover, to the output circuit of the input filter 9, 10 is connected an amplitude detector 13, 14 and a low band-pass filter 15, 16 respectively, having a limit frequency of, for example, 40 c./s. for producing a voltage which varies with the level of the signals in the formant regions from 800 to 2000 c./s. and from 2000 to 3200 c./s. and which, together with the output voltages of the formant frequency detectors 11 and 12 is transferred to the receiver end.

For the sake of simplicity the signals of the first formant region, the output voltages of the formant frequency detectors 11, 12 and the output voltages of the amplitude detectors 13, 15 and 14, 16 are fed in the apparatus described and shown diagrammatically, via separate conductors 17, 18, 19, 20 and 21 to the receiver. In the practical embodiment the transmission of these signals is carried out via a single conductor, preferably in the manner to be described with reference to FIGS. 5 and 6.

Figure 2:
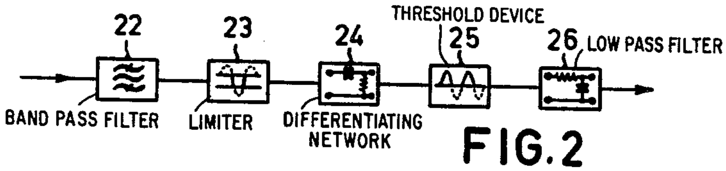
FIG. 2 shows an embodiment of a formant frequency detector and fundamental tone frequency detector for use in a device according to the invention.

FIG. 2 shows the formant frequency detector used in the transmission apparatus shown. With this formant frequency detector the signals derived from a filter 22 and lying in the formant region from 800 to 2000 c./s. and from 2000 to 3200 c./s. are fed to a limiter 23, which is followed by a differentiating network 24, which converts the square-wave signal obtained by the limitation into a sequence of successive positive and negative pulses, and followed by a threshold device 25, which suppresses, for example the negative pulses. At the output circuit of the threshold device 25 is thus produced a sequence of positive pulses, of which the number per unit time varies with the formant frequency, so that by smoothing these pulses in a low bandpass filter 26 with a limit frequency of, for example, 30 c./s., a voltage is obtained which varies with the formant frequency.

Instead of using the formant frequency detector shown in FIG. 2, use may be made of formant frequency detectors of a different type, for example, as described in the British patent specification 844,561.

As compared with the bandwidth of the initial speech signal of 2.9 kc./s., a considerable reduction in bandwidth is obtained in this case, since the total bandwidth of the transmitted signals amounts to $500+2\times 30+2\times 40=640$ c./s., and the speech signal transmitted by bandcompression can be reproduced at the receiver end with a particularly satisfactory quality.

The receiver co-operating with the transmitter described above comprises a number of parallel-connected channels 27, 28 and 29, corresponding the those of the transmitter, and fed via conductors 17, 18, 19, 20 and 21 by the signals representing the various formant regions; the receiving channel 27, corresponding to the transmitter channel 5, allows the incoming signals of the lowest formant region from 300 to 800 c./s. to pass with natural fidelity, whereas in the further receiving channels 28, 29 band expansion is carried out.

To this end the receiver is provided with a local relaxation generator 30, which furnishes a relaxation oscillation, decreasing in a sawtooth like manner, and having a repetition frequency in the fundamental tone frequency region from 800 to 300 c./s.; this relaxation generator 30 controls the two band expansion channels 28 and 29 by way of a frequency transposition stage 31 with an associated local oscillator 32 and an output filter 33. The relaxation oscillation may, for example, be amplitude-modulated in the frequency transposition stage 31 on a local carrier frequency of 32 kc./s.

Each of the band expansion channels 28, 29 comprises, in order of succession, a level control device formed by a variable amplifier 34, 35, which is controlled by way of conductors 18, 20 by the control-voltage varying with the level of the signals in the formant regions from 800 to 2000 c./s. and from 2000 to 3200 c./s. and orignating from the amplitude detectors 13, 14, and an amplitude modulator stage 36, 37 with the associated output filter 38, 39 and a local oscillator 40, 41, of which the frequency is controlled with the aid of the frequency corrector 42, 43 for example a reactance tube, via a conductor 19, 21 by the output voltages of the formant frequency detectors 11, 12. In the band expansion channels 28, 29 the relaxation oscillations of the frequency transposition stage 31 amplitude-modulated on the carrier frequency of 32 kc./s. are transposed subsequent to level control in the control amplifier 34, 35 in the amplitude modulator stage 36, 37 to the respective formant regions from 800 to 2000 c.s. and from 2000 to 3200 c.s. by the oscillations from local oscillators 40 and 41, of which the frequency is varied in accordance with the output voltage of the formant frequency detectors 11, 12 in the corresponding band compression channels 19, 21 in the frequency region from 31.2 to 30 kc./s. and from 30 to 28.8 kc./s.

For the reproduction of the transmitted speech signals the output voltages of the two band expansion channels 28, 29, with the output voltage of the channel 27, which allows to pass the signals of the lowest formant region from 300 to 800 c./s. via the filter 44 with the natural fidelity, are fed, subsequent to low-frequency amplification in a low-frequency amplifier 45 to a reproducing device 46.

In the embodiment shown the repetition frequency of the relaxation generator 30 follows accurately the fundamental tone frequency, which may be realized in a simple manner by connecting to the first receiver channel 27, which allows the speech signals of the first formant region from 300 to 800 c./s. to pass with natural fidelity, a fundamental tone detector, followed by an amplitude detector 47 and a low-bandpass filter 48 with a limited frequency of 300 c./s. and a fundamental tone frequency detector 49 for producing a control-voltage varying with the fundamental tone frequency and controlling the frequency of the relaxation generator 30. Structurally the fundamental tone frequency detector 49 may be identical to the formant frequency detector described with reference to FIG. 2.

With the apparatus so far described it has been found that an excellent reproducing quality is obtained and that, in order to achieve optimum reproduction quality, the shape of the sawtooth relaxation oscillation is to be supervised particularly; the best results were obtained with an exponentially decreasing relaxation oscillation, decreasing with a time constant, hereinafter termed the relaxation time constant, lying between 1.5 and 4 msec. Beyond these limits of the relaxation time constant of the relaxation oscillation the reproduction quality diminishes rapidly; it has been found that with a time constant of less than 1.5 msec. signal distortion occurs, whereas with a time constant of more than 4 msec. interference notes are produced.

Figure 3:
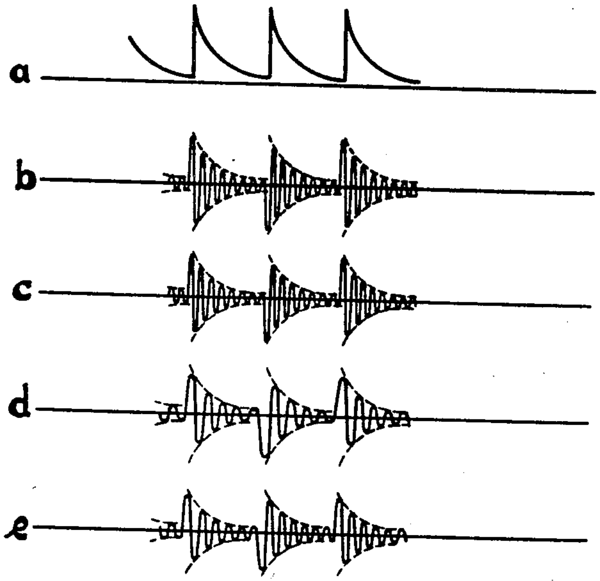
FIG. 3 shows a few time diagrams to explain the transmission apparatus shown in FIG. 1.

FIG. 3*a* illustrated the sawtooth relaxation oscillations produced by the relaxation generator 30; these oscillations decrease exponentially in this embodiment with a time constant of 2.5 msec. FIGS. 3*b* and 3*c* illustrate the output voltages of the control-amplifiers 34, 35 and FIGS. 3*d* and 3*e* illustrate the output voltages of the two band expansion channels 28, 29; together with the signals allowed to pass with natural fidelity by the band expansion channel 27 in the lowest formant region these voltages are fed to the reproducing device 46.

Not only by its remarkable simplicity but also by its excellent reproduction quality the transmission apparatus described above is particularly distinguished; this quality is achieved not only in the reproduction of vowels but also of consonants particularly the consonants "Z" and "V," which are characterized mainly by a noise-like frequency spectrum in the higher formant regions, are reproduced with satisfactory fidelity.

In this apparatus a satisfactory consonant reproduction does not require additional means.

A reasonable reproduction quality does not require to provide with the aid of the fundamental tone detector 47, 48 and a fundamental tone frequency detector 49, that the repetition frequency of the relaxation oscillation should follow the fundamental tone frequency in the transmitted signals; it will suffice to use a fixed repetition frequency up to for example 160 c./s.; it has been found that, the reproduction quality is dependent upon the repetition frequency of the relaxation oscillation produced to a considerably smaller extent than upon the waveform of the relaxation oscillation. Instead of using fundamental tone detectors 47, 48 and a fundamental tone frequency detector 49, a distinction between men's voices and women's voices may suffice for obtaining a satisfactory reproduction quality; the repetition frequency for the reproduction of men's voices may, for example be 130 c./s. and for women's voices 220 c./s.

Figure 4:
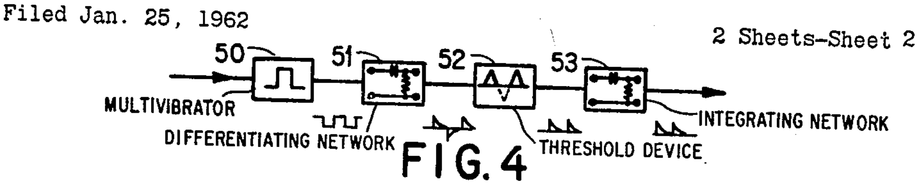
FIG. 4 shows a relaxation generator for use in the device according to the invention and FIGS. 5 and 6 show a block diagram of a practical embodiment of a transmitter and a receiver in a transmission apparatus according to the invention.

FIG. 4 shows in detail the relaxation generator 30, used in the transmission apparatus shown, which fulfils in a simple manner the aforesaid requirements for an excellent reproduction quality.

The relaxation generator shown comprises a multivibrator 50 having a repetition frequency of, for example, 160 c./s., for producing square-wave voltages and furthermore a differentiating network 51, which converts the square-wave output voltage of the multivibrator 50 into a sequence of successive positive and negative pulses, and a threshold device 52, which suppresses, for example, the negative pulses. Thus at the output circuit of the threshold device is produced a sequence of positive pulses with a repetition frequency of 160 c./s., which pulses furnish, when supplied to an integrating network 53 with a time constant of 2.5 msec., the sawtooth relaxation oscillations illustrated in FIG. 3*a*. For the sake of clarity the waveforms of the voltages produced by the elements of the relaxation generator are illustrated at the respective sides.

Figure 5:
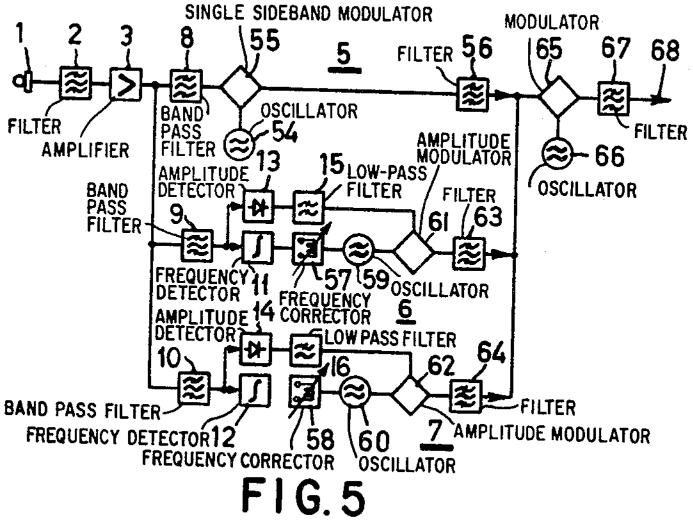
Figure 6:
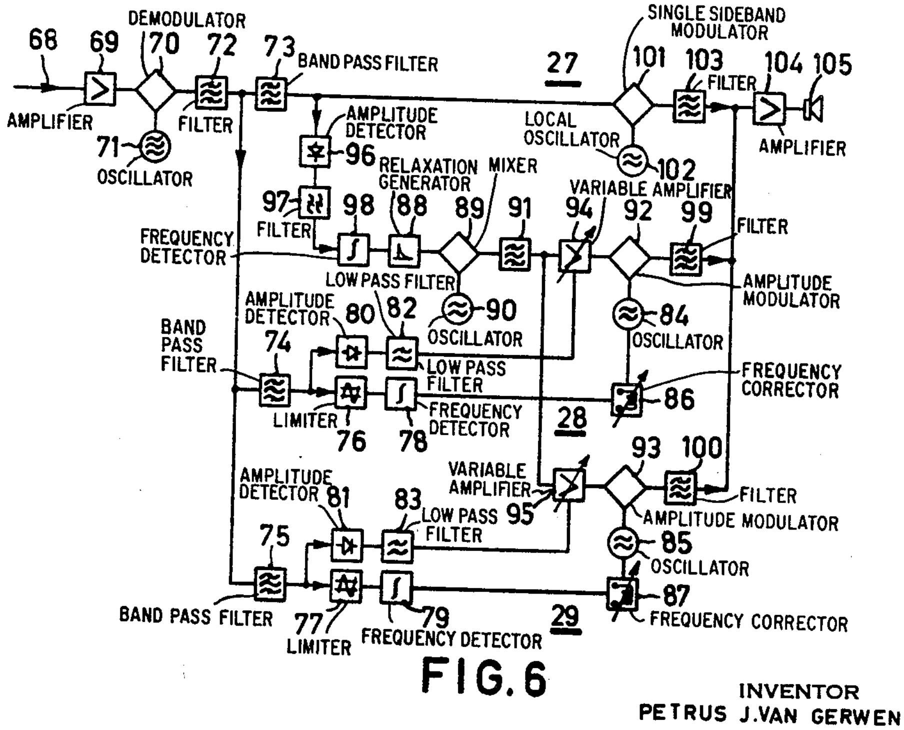

FIGS. 5 and 6 show a transmitter and a receiver respectively used in a transmission apparatus according to the invention, suitable for single-sideband transmission. In this transmission apparatus the elements corresponding to those of FIG. 1 are designated by the same reference numerals.

In the transmitter shown in FIG. 5 the speech signals obtained from the microphone 1 are fed in the manner described with reference to FIG. 1 for band compression filters 8, 9 and 10, allowing the various formant regions to pass, to three channels 5, 6 and 7; the signals of the channels 6 and 7 are fed on the one hand to the formant frequency detectors 11 and 12 respectively and on the other hand to the amplitude detectors 13, 15 and 14, 16 respectively in order to obtain a voltage which varies with the level of the signals allowed to pass by the filters 9 and 10 respectively.

In the channel 5 the signals passing the filter 8 and lying in the lowest formant region from 0.3 to 0.8 kc./s. are fed to a single-sideband modulator 55, connected to an oscillator 54 of 6 kc./s. and having a single-sideband filter 56, passing the upper sideband of 6.3–6.8 kc./s., whereas in the channels 6 and 7 the output voltages of the formant frequency detectors 11 and 12 respectively control, via frequency correctors 57 and 58 respectively, oscillators 59 and 60 respectively in frequency, whilst the oscillator voltage is amplitude-modulated in an amplitude modulator 61 and 62 respectively with output filters 63 and 64 respectively by the level voltage originating from the amplitude detectors 13, 15 and 14, 16 respectively.

In the transmitter shown the local oscillators 59 and 60 are frequency-modulated by the output voltages of the formant frequency detectors 11 and 12 respectively, the modulation index may, for example, be 1 and the frequency-modulated oscillation thus obtained, of which the frequencies vary within a range of 30 c./s., are amplitude-modulated in the amplitude modulators 61, 62 respectively by the output voltages of the amplitude detectors 13, 15 and 14, 16 respectively. The central frequencies of the oscillators 59 and 60 amount to about 6.86 kc./s. and 6.96 kc./s. respectively; the frequency space left between the single-sideband signal of 6.3–6.8 kc./s. and the central oscillator frequency of the oscillator 59 and between the central frequencies of the oscillators 59 and 60 is utilized for the transmission of the frequency-modulation and the amplitude-modulation of the oscillations from the oscillators 59 and 60. The pass ranges of the filters 56, 63 and 64 are, for example, 6.30–6.80 kc./s., 6.82–6.90 kc./s. and 6.92–7.00 kc./s. respectively.

The output voltages of the channels 5, 6 and 7 thus obtained are transmitted via a group modulator 65 with an oscillator 66 and a single-sideband filter 67 by single-sideband modulation to a cable 68. The bandwidth of the output signal fed to the cable 68 is about 0.7 kc./s. and with respect to the initial speech signal (2.9 kc./s.) a considerable reduction in bandwidth is obtained.

FIG. 6 shows the receiver co-operating with the transmitter shown in FIG. 5.

The incoming single-sideband signals from the transmission cable 68 are fed, subsequent to high-frequency amplification in the amplifier 69 via a group demodulator 70 with an oscillator 71 connected thereto and an output filter 72, in order to retain the initial speech signal, to a band expansion device comprising three parallel-connected channels 27, 28 and 29, corresponding with the channels 5, 6 and 7 in the transmitter.

The channels 27, 28 and 29 are provided each with an input filter 73, 74 and 75 respectively which split up the single-sideband signal derived from the group demodulator 70 and lying, for example, in the frequency range from 6.3 to 7.0 kc./s. into signals representing the three formant regions in the bands from 6.30 to 6.80 kc./s., 6.82 to 6.90 kc./s. and 6.92 to 7.00 kc./s.; the single-sideband signal from 6.30 to 6.80 kc./s. is passed by the channel 27 with natural fidelity, whereas the signal associated with the expansion channel 28 and 29 respectively are fed on the one hand via limiters 76 and 77 respectively to frequency detectors 78 and 79 respectively and on the other hand to amplitude detectors 80 and 81 respectively, comprising low bandpass filters 82 and 83 respectively, having a limit frequency of, for example, 40 c./s.

At the output circuits of the frequency detectors 78 and 79 and the amplitude detectors 80, 82 and 81, 83 occur voltages which vary with the formant frequency and with the level of the signals in the formant regions from 800 to 2000 c./s. and from 2000 to 3200 c./s. and which are processed in completely the same manner as those described with reference to FIG. 1. The output voltages of the frequency detectors 78 and 79 vary the frequency of the local oscillators 84 and 85 respectively by way of frequency correctors 86 and 87 respectively within the frequency ranges from 31.2 to 30 kc./s. and from 30 to 28.8 kc./s. respectively, in order to transpose the signals obtained from the relaxation generator 88 in the band expansion channels 28, 29, subsequent by frequency transposition in the transportion stage 89 with local oscillator 90 of 32 kc./s. and an output filter 91 in amplitude modulator stages 92 and 93 to the second and the third formant region respectively, whilst between the output filter 91 of the frequency transposition stage 91 and the amplitude demodulator 92, 93 is connected a control-amplifier 94, 95 respectively, serving for level control. As in the device shown in FIG. 1 the relaxation generator 88 follows the fundamental tone frequency in the transmitted signals; the signals passed with natural fidelity in the first formant region are fed by way of a fundamental tone amplitude detector 96 and an output filter 97 to the fundamental tone frequency detector 98, which controls the frequency of the relaxation generator 88.

The output voltage of the amplitude modulator stages 92, 93 in the band expansion channels 28 and 29 respectively are fed via filters 99 and 100 respectively, together with the signals of the first formant region, obtained from a single-sideband modulator 101 with a local carrier wave oscillator 102 connected thereto having a frequency of 6 kc./s. and an output filter 103, via a low-frequency amplifier 104 to a reproducing device 105. Similarly to the manner described with reference to FIG. 1, the band compression and the band expansion are obtained also in this apparatus.

What is claimed is:

1. A transmission system for speech signals comprising a transmitter having a band compression device and a receiver having a band expansion device, said band compression device comprising a plurality of channels, means applying signals of different formant frequency regions to said channels, one of said channels passing signals without compression, the remainder of said channels each comprising a formant frequency detector for providing an output voltage varying with the frequency of the signal of the respective formant frequency region, said receiver comprising means for receiving the signal output of said one channel and said output voltages of the remainder of said channels, said band expansion device comprising means for passing said output signals without expansion, a separate oscillator corresponding to each of the remainder of said channels, means for varying the frequency of said separate oscillator with the received output voltage of the corresponding channel, relaxation oscillator means for providing a sawtooth waveform voltage, a separate amplitude modulator means for each said separate oscillator, means applying said sawtooth waveform voltage and the output of the respective separate oscillator to said amplitude modulator means, and means combining the signals passed without expansion and the outputs of said separate amplitude modulator means.

2. A transmission system for speech signals comprising a transmitter having a band compression device and a receiver having a band expansion device, said band compression device comprising a plurality of channels, means applying signals of different formant frequency regions to said channels, the one channel corresponding to the lowest formant frequency being connected to pass signals without compression, the remainder of said channels each comprising a formant frequency detector for providing an output voltage varying with the frequency of the signal of the respective formant frequency region, said receiver comprising means for receiving the signal output of said one channel and said output voltages of the remainder of said channels, said band expansion device comprising means for passing said output signals without expansion, a separate oscillator corresponding to each of the remainder of said channels, means for varying the frequency of said separate oscillator with the received output voltage of the corresponding channel, relaxation oscillator means for providing a sawtooth waveform voltage, means for controlling the repetition frequency of said sawtooth waveform voltage as a function of the fundamental tone frequency of said output signals, a separate amplitude modulator means for each said separate oscillator, means applying said sawtooth waveform voltage and the output of the respective separate oscillator to said separate amplitude modulator means, and means combining the output signals passed without expansion and the outputs of said separate amplitude modulator means.

3. The system of claim 2, wherein said relaxation oscillator means comprises a relaxation timing circuit having a time constant between 1.5 and 4 milliseconds whereby said sawtooth waveform voltage decreases exponentially at a rate determined by said time constant.

4. The system of claim 2, wherein said relaxation oscillator means comprises a multivibrator, a differentiating network, threshold means, and integrating means, connected in that order.

5. The system of claim 2, wherein said means for controlling the repetition frequency of said relaxation oscillator means comprises fundamental tone detector means connected to said means for passing signals without expansion, fundamental tone frequency detector means connected to said fundamental tone detector means for providing a control voltage which varies with the fundamental tone frequency of said output signal, and means for applying said control voltage to said relaxation oscillator means for controlling the repetition frequency thereof.

6. The system of claim 2, wherein each of said remainder of channels in said compression device comprises separate amplitude detector means for providing a level control voltage, said receiver comprises means for receiving said level control voltage, comprising separate level control means connected in series with said amplitude modulator means, and means applying said level control voltage to the respective level control means.

7. A transmission system for speech signals comprising a transmitter having a band compression device and a receiver having a band expansion device, said band compression device comprising a pluraltiy of channels, means applying signals of different formant frequency regions to said channels, the one channel corresponding to the lowest formant frequency region being connected to pass signals without compression, the remainder of said channels each comprising a formant frequency detector for providing an output voltage varying with the frequency of the signal of the respective formant frequency region, said receiver comprising means for receiving the signal output of said one channel and said output voltages of the remainder of said channels, said band expansion device comprising means for passing said output signals without expansion, a separate oscillator corresponding to each of the remainder of said channels, means for varying the frequency of said separate oscillator with the received output voltage of the corresponding channel, relaxation oscillator means for providing a sawtooth waveform voltage having a repetition frequency within the formant frequency region of said one channel, means connected to said means for passing output signals without expansion for varying the frequency of said sawtooth waveform voltage with the fundamental tone frequency of said output signal, means for transposing the output voltage of said relaxation generator to a higher frequency band, a separate amplitude modulator means for each said separate oscillator, means applying said frequency transposed output voltage and the output voltage of the respective separate oscillator to said separate amplitude modulator means, and means combining the output signals passed without expansion and the outputs of said separate amplitude modulator means.

References Cited in the file of this patent

UNITED STATES PATENTS 3,003,037 De Jager et al. ___________ Oct. 3, 1961

UNITED STATES PATENT OFFICE

CERTIFICATE OF CORRECTION

Patent No. 3,142,727 July 28, 1964

Petrus Josephus van Gerwen

It is hereby certified that error appears in the above numbered patent requiring correction and that the said Letters Patent should read as corrected below.

Column 7, line 9, after "frequency" insert -- region --.

Signed and sealed this 8th day of December 1964.

(SEAL)
Attest:

ERNEST W. SWIDER
Attesting Officer

EDWARD J. BRENNER
Commissioner of Patents